(12) United States Patent
Daigle et al.

(10) Patent No.: US 10,549,642 B2
(45) Date of Patent: Feb. 4, 2020

(54) SYSTEM AND METHOD FOR POWERING AN ENGINE-DRIVEN PLATFORM

(71) Applicant: Transportation IP Holdings, LLC, Norwalk, CT (US)

(72) Inventors: Jeffrey Louis Daigle, Erie, PA (US); Frank William Veit, Erie, PA (US); Paul Robert Gemin, Erie, PA (US); Brandon James Larson, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 361 days.

(21) Appl. No.: 15/317,507

(22) PCT Filed: Jun. 17, 2015

(86) PCT No.: PCT/US2015/036199
§ 371 (c)(1),
(2) Date: Dec. 9, 2016

(87) PCT Pub. No.: WO2015/195782
PCT Pub. Date: Dec. 23, 2015

(65) Prior Publication Data
US 2018/0154780 A1 Jun. 7, 2018

Related U.S. Application Data

(60) Provisional application No. 62/013,128, filed on Jun. 17, 2014.

(51) Int. Cl.
*H02K 7/18* (2006.01)
*B60L 11/08* (2006.01)
(Continued)

(52) U.S. Cl.
CPC ............. *B60L 11/08* (2013.01); *B63B 35/66* (2013.01); *B63H 21/17* (2013.01); *B63J 3/02* (2013.01);
(Continued)

(58) Field of Classification Search
None
See application file for complete search history.

(56) References Cited

U.S. PATENT DOCUMENTS

2003/0030416 A1  2/2003  Fukaya
2008/0143182 A1*  6/2008  Raju .................. B60L 11/08
                                                 307/26
(Continued)

OTHER PUBLICATIONS

PCT Search Report and Written Opinion issued in connection with Corresponding PCT Application No. PCT/US2015/036199 dated Sep. 1, 2015.

*Primary Examiner* — Thienvu V Tran
*Assistant Examiner* — David M Stables
(74) *Attorney, Agent, or Firm* — McCoy Russell LLP (57) ABSTRACT

A system for providing mechanical and electrical power in a vehicle or other engine-driven platform includes a first engine having a first power rating and a second engine having a second power rating that is less than the first power rating. The system further includes a first generator (for example, an alternator) for generating electrical power for a load operation (such as vehicle propulsion), and a second generator (for example, a DFIG) for generating fixed frequency electrical power; both generators are operatively connected to and powered by the first and/or second engines. The first and/or second engines may be selected to power the first generator for generating power for vehicle propulsion or another load operation depending upon situational power requirements of the engine-driven platform.

21 Claims, 6 Drawing Sheets

(51) Int. Cl.
    *B63J 3/02*         (2006.01)
    *B63H 21/17*      (2006.01)
    *B63B 35/66*      (2006.01)
    *F02B 63/04*      (2006.01)
    *H02J 1/10*       (2006.01)

(52) U.S. Cl.
    CPC ............ *F02B 63/042* (2013.01); *H02J 1/102* (2013.01); *H02K 7/1815* (2013.01); *B60L 2200/32* (2013.01); *B60L 2210/30* (2013.01); *B63B 2755/00* (2013.01); *H02J 2001/106* (2013.01)

(56) References Cited

U.S. PATENT DOCUMENTS

| | | |
|---|---|---|
| 2010/0170414 A1 | 7/2010 | Hardin et al. |
| 2010/0274420 A1 | 10/2010 | Veit et al. |
| 2013/0062938 A1 | 3/2013 | Kumar |
| 2014/0145028 A1 | 5/2014 | Gomez |

\* cited by examiner

SYSTEM AND METHOD FOR POWERING AN ENGINE-DRIVEN PLATFORM

CROSS-REFERENCE TO RELATED APPLICATIONS

This application is a national stage application under 35 U.S.C. § 371(c) of prior filed PCT application serial number PCT/US2015/036199, filed Jun. 17, 2015, which claims priority to U.S. Provisional Application No. 62/013,128, filed Jun. 17, 2014. The above-listed applications are incorporated by reference herein in their entirety.

FIELD OF THE INVENTION

Embodiments of the invention relate generally to systems and methods for powering vehicles and other engine-driven platforms. Certain embodiments relate to multi-engine systems for powering vehicles and other engine-driven platforms.

BACKGROUND OF THE INVENTION

Marine vessels such as tugboats are often used to tow or push other marine vessels in harbors, over the open sea, or through rivers and canals. They are also used to tow barges, disabled ships, or other equipment. Such vessels are typically powered by an on-board thermal prime mover, e.g., one or more diesel engines. A common propulsion system includes a pair of relatively large, high power, e.g., 2000 plus horsepower, diesel engines.

Tugboats, however, have widely varying propulsion loads. That is, propulsion of tugboats is often characterized by long periods of low power punctuated by shorter periods of high power propulsion. When undertaking low power tasks, dedicated high power propulsion engines rarely operate at peak engine efficiencies. This may result in the engine emitting greater amounts of pollutants such as carbon dioxide, and/or consuming more fuel, than if the engine was operating at a higher level of efficiency. Also, the larger the diesel engine, the more space required to house the engine in the tugboat.

In many tugboats, diesel engines provide electrical power both for propulsion and for powering various on-board service or auxiliary loads, such as, for example, a motor for moving a tow winch. The electrical power is produced at a constant, fixed frequency, typically 50 or 60 Hz. In many systems, a separate additional pair of auxiliary engines is employed to generate constant frequency electrical power, for a total of four engines. As will be appreciated, the greater the number of on board engines, the greater amount of space required, in addition to increased fuel consumption, emissions, and maintenance costs.

It may be desirable, therefore, to provide a system and method for powering a marine vessel, other vehicle, or other engine-driven platform that differ from existing systems and methods.

BRIEF DESCRIPTION

In an embodiment, a system (e.g., a power system for an engine-driven platform) includes a high power engine disposed in an engine-driven platform, a low power engine, a first generator, a second generator, and a controller. (High and low are relative to one another, meaning the high power engine has a higher engine power than the low power engine and the low power engine has a lower engine power than the high power engine. Engine power is the maximum power that an engine can put out.) The first generator is configured to generate first electrical power for a load operation of the engine-driven platform. (Load operation generally refers to an operation of the engine-driven platform for vehicle propulsion and/or electrically powering an off-board load, the former including moving or hauling cargo or other items and pushing or pulling other vehicles or other off-board loads.) The high power engine and the low power engine are operably coupled for either to drive the first generator. The second generator is configured to generate second electrical power. The controller is configured to select either of the low power engine or the high power engine to drive the first generator based on the load operation, e.g., based on a magnitude of the load operation the engine-driven platform is currently performing.

In another embodiment, a system (e.g., a power system for an engine-driven platform) includes a first engine, a second engine, a first generator, a second generator, and a controller. The first and second engines are disposed in an engine-driven platform and have first and second engine powers, respectively. The second engine power is lower than the first engine power. The first generator is operatively connected to the first engine and to the second engine, and is configured to be driven by either of the first engine or the second engine for generating first electrical power for a load operation of the engine-driven platform. The second generator is operatively connected to the first engine and to the second engine, and is configured to be driven by either of the first engine or the second engine for generating second electrical power. The controller is configured to select the first engine for driving the first generator in a first mode of operation of the engine-driven platform for a relatively higher power level of load operation (e.g., vehicle propulsion that includes moving cargo and/or an off-board load) and to select the second engine for driving the first generator in a second mode of operation of the engine-driven platform for a relatively lower power level of load operation (e.g., vehicle propulsion without cargo and/or an off-board load).

In another embodiment, a method of powering an engine-driven platform includes determining (e.g., with a controller) power requirements for the engine-driven platform to complete a task, selecting an engine having an engine power appropriate to complete the task from a plurality of engines on board the engine-driven platform each having different engine powers, and providing fixed frequency electrical power from one of the plurality of engines.

BRIEF DESCRIPTION OF THE DRAWINGS

The present invention will be better understood from reading the following description of non-limiting embodiments, with reference to the attached drawings, wherein below.

DETAILED DESCRIPTION

Aspects of the invention relate to engine or power systems for marine vessels, other vehicles, and other engine-driven platforms that have widely varying loads (e.g., propulsion loads) during operation. In an embodiment, for example, a system for a vehicle includes two separate engines, one having a higher engine power than the other. The engines are coupled to a common frame having plural generators (e.g., alternators), such that the generators can be powered by either engine. The generators may include a propulsion alternator for generating electricity to power one or more traction motors to move the vehicle, and a second alternator to power auxiliary loads at a fixed frequency. Efficiencies may be increased by using the higher power engine to run the propulsion alternator during periods of higher propulsion loads and the lower power engine to run the propulsion alternator during periods of lower propulsion loads. For example, if a vehicle haul cycle involves operating more often at lower propulsion loads than at higher propulsion loads (e.g., moving a cargo load for 20% of the time, and not moving a cargo load the remaining time), it may be more efficient, according to aspects of the invention, to use a lower power engine for the lower load periods and a higher power engine for the higher load periods, than to run the vehicle for propulsion, regardless of load, using only a dedicated relatively high-power propulsion engine.

Figure 1:
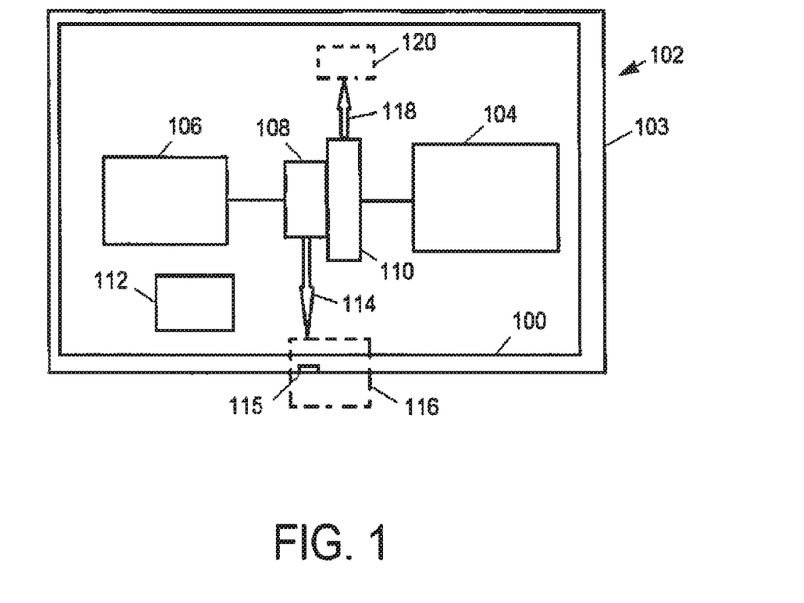
FIG. 1 is a schematic diagram of a system for powering an engine-driven platform, according to an embodiment of the invention.

FIG. 1 illustrates a first embodiment of a system 100 for powering an engine-driven platform 102. The engine-driven platform is an electro-mechanical system having a chassis or other frame 103 that can support at least one internal combustion engine, which electrically and/or mechanically powers one or more loads. Examples include marine vessels, rail vehicles, mining equipment, and other off-highway vehicles, automobiles, semi-trailer trucks, and other on-road transportation vehicles, and stationary or semi-stationary generator units. The system includes a first, high power engine 104 disposed in the engine-driven platform, a second, low power engine 106, a first generator 108, a second generator 110, and a controller 112. ("Generator" generally refers to devices that convert mechanical energy to electrical energy for use in a circuit.) The first generator is configured to generate first electrical power 114 for a load operation 116 of the engine-driven platform, e.g., as noted above, for electrically powering an off-board load and/or for vehicle propulsion, such as moving or hauling cargo or other items and pushing or pulling other vehicles or other off-board loads. The high power engine and the low power engine are operably coupled for either to drive the first generator. The second generator 110 is configured to generate second electrical power 118, e.g., for powering auxiliary loads 120. (The auxiliary loads may include loads that are not for vehicle propulsion and/or that are not external to the engine-driven platform.) The controller 112 is configured to select either of the low power engine 106 or the high power engine 104 to drive the first generator based on the load operation. For example, the controller may be configured to select the high power engine to drive the first generator during periods of a relatively higher power level of the load operation (that is, when a load operation the platform is carrying out requires a higher power level) and to select the low power engine to drive the first generator during periods of a relatively lower power level of the load operation (that is, when the load operation the platform is carrying out requires a lower power level). The controller may be configured to determine the general range of the magnitude of the load operation (i.e., to distinguish between load operations that require lower levels of power and load operations that require higher levels of power) based on one or more of: operator control of an operator input; a trip plan of the engine-driven platform; information of a designated haul cycle or duty cycle of the engine-driven platform, including historical data of the haul cycle or duty cycle; vehicle information (e.g., of a current cargo or pushing/pulling load of the vehicle), such as vehicle profile information that is stored in an on-board memory prior to start of a trip, mission, task, etc.; received sensor or other signals relating to current vehicle operating conditions; and/or the like.

In any of the embodiments herein, the first and/or second engines may be diesel engines that combust air and diesel fuel through compression ignition. In other embodiments, the first and/or second engines may combust fuel including gasoline, kerosene, biodiesel, or other petroleum distillates through compression ignition (and/or spark ignition), and/or natural gas. In other embodiments, the first and/or second engines are dual fuel engines that operate on two or more types of discrete fuels (e.g., fuels stored in separate fuel tanks), such as diesel and natural gas. In terms of fuel usage, the first and second engines may be the same type of engine (e.g., both diesel engines), or they may be different types. Further, the engines may be a V-6, V-8, V-10, V-12, V-16, I-4, I-6, I-8, opposed 4, or another engine type. Further, the engines may be turbocharged, supercharged, or naturally aspirated.

As noted above, and as used herein, engine power, also known as engine power rating or just power rating, is the maximum power that an engine can output. Engine power may be characterized, unit-wise, in terms of horsepower (hp), brake horsepower (bhp), or kilowatts (kW), for example. As also noted, a high power engine is one having a higher engine power than that of a low power engine, which correspondingly has an engine power that is lower than that of the high power engine, i.e., the high power engine has a first engine power and the low power engine has a different, second engine power, with the second engine power being lower than the first engine power. In one embodiment, for example, the first, high power engine has a power rating of at least 1000 hp, and the second, low power engine has a power rating of from about ¼ to about $\frac{1}{10}^{th}$ that of the high power engine. In an embodiment, the low power engine is a 400 hp to 500 hp diesel (or other) engine and the high power engine is a 4000 hp to 5000 hp (e.g., 4400 hp) diesel (or other) engine. While differing engine displacements may create the difference in power ratings, in certain embodiments, it may be possible to disable cylinders, reduce turbocharger boost, or otherwise lower the power of one of the engines to create an engine configuration with differing power ratings.

Figure 2:
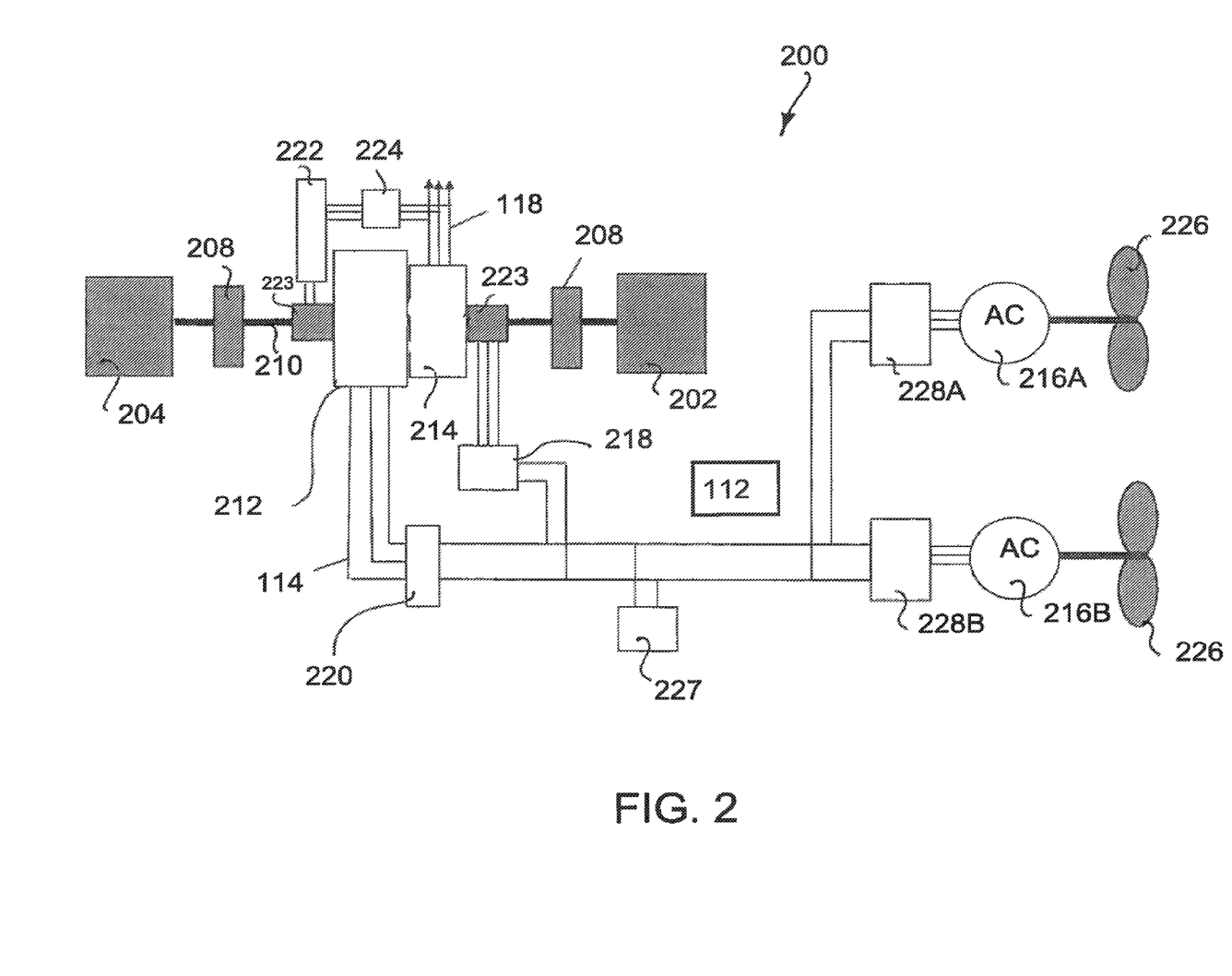
FIG. 2 is a schematic diagram of another embodiment of a system for powering an engine-driven platform.

FIG. 2 illustrates another embodiment of a system 200 for powering an engine-driven platform, which is shown in this example as a marine vessel. However, aspects of FIG. 2 are applicable to other vehicles and other engine-driven platforms more generally, as discussed below and elsewhere herein. The system 200 includes first and second engines 202, 204, which are configured to generate both mechanical power for propulsion (by way of generating first, AC electrical power 114 to run AC traction motors) and second electrical power 118 for onboard service (auxiliary loads), including constant fixed frequency power.

As shown, in this embodiment each engine 202, 204 is operably connected to a common rotatable generator shaft 210 via a respective clutch 208, to equalize the speed of the shaft with respect to the differently powered engines 202, 204. (Depending on the particular system/clutch configuration, the drive train may further include one or more reduction gears.) The clutches 208 allow either engine 202, 204 to be mechanically isolated such that the isolated engine does not rotate the generator shaft 210. The shaft 210, in turn, is rotatably connected to a generator frame or housing that holds the first and second generators. (The frame or housing may be a one-piece design or an assembly of multiple constituent pieces.) Here, the first generator is a first, propulsion alternator 212, and the second generator is a second, power or service alternator 214. The propulsion alternator 212 is configured to generate the first electrical power 114 for a load operation, which includes vehicle propulsion. In particular, the first electrical power as generated by the propulsion alternator 212 is 3-phase AC electrical power. This is routed to a rectifier 220, which is configured to convert the 3-phase AC electrical power to DC electrical power. The DC electrical power is routed to one or more inverters, which are controlled to convert the DC electrical power into AC electrical power having a waveform suitable for powering one or more AC electric motors. In the embodiment of FIG. 2, the system includes two inverters 228A, 228B and two AC motors 216A, 216B respectively coupled to outputs of the inverters 228A, 228B. Output shafts of the motors are operably coupled to respective propellers 226. (The term 'propeller' includes both propellers and impellers, which are used in water jet marine propulsion systems.) In the case of land vehicles, the motors may be operably coupled to axles and/or wheels of the vehicle. Such a land vehicle could include one or two such inverter-motor pairs (for a two wheel drive vehicle, for example), three such inverter-motor pairs (for a 3-axle rail vehicle bogie, for example), four such inverter-motor pairs (for a four wheel drive road vehicle, for example, or a locomotive or other rail vehicle), etc. In a particular embodiment of a tugboat or other marine vessel, the inverters 228A, 228B are each a 2000 hp inverter, and the AC motors 216A, 216B are each a 2000 hp AC traction motor, e.g., 3-phase AC induction motor.

In embodiments, the service alternator 214 is configured to provide electrical power 118 at a fixed frequency, meaning that while the alternator is operating as per design, it produces electrical power at a given frequency that may fluctuate due to operating transients, but not to such an extent that would damage downstream electrical equipment or prevent such electrical equipment from operating nominally. According to one aspect, the fixed frequency electrical power is 50 Hz AC. In another aspect, the fixed frequency electrical power is 60 Hz AC. In either case, the AC electrical power may be 1-phase, 3-phase, etc.

The second alternator 214 may be a doubly fed induction generator (DFIG). DFIGs are useful in producing fixed frequency electrical power particularly when the frequency of the alternator shaft 210 does not match that of the fixed frequency used by the onboard equipment. As shown, the DFIG 214 utilizes a field inverter 218, which converts DC rectified current from the rectifier 220 to AC to supply the rotor of the DFIG to make up frequency as needed when the alternator shaft is not rotating. In other embodiments, a self-excited induction generator may be employed.

The fixed frequency power produced by the DFIG 214 also provides electrical power to a field control AC-to-DC converter (i.e., rectifier) 222 used by the propulsion alternator 212. In particular, fixed frequency power is supplied to the converter 222 via a transformer 224 and then to the propulsion alternator via a field connection 223.

As shown, the system 200 may also include a battery 227, which stores rectified DC power provided by the propulsion alternator 212. The stored power may be sent back into the system for use in propulsion.

Embodiments of the system 200 further include a controller 112, such as a computer control system having non-transitory, computer readable storage media that includes code for enabling on-board monitoring and control of engine operation to optimize or otherwise improve engine efficiency. (For clarity of illustration, the controller 112 is shown schematically in the figures as a stand-alone box. However, in an implemented embodiment, the controller would be electrically connected to one or more other components of the system, as needed.) The controller, while overseeing control and management of the engine-driven platform, can be configured to receive signals from a variety of engine sensors, in order to determine operating parameters and operating conditions, and correspondingly adjust various engine actuators to control operation of the engine-driven platform. For example, the controller may receive signals from various engine sensors including sensors that assess engine speed, engine load, and the like.

In use, the engine 202 or 204 selected for propulsion or another load operation is based on the situational power requirements of the engine-driven platform. That is, the low power engine 204 may be used (to run the generator that generates electrical power for propulsion or other load operations) when a reduced amount of power is required, such as, in a marine vessel or other vehicle context, transit to and from tasks. The high power engine 202 may be used to complete tasks that require higher power levels, such as towing other marine vessels. The system allows either engine to provide propulsion (or other load operation) power, giving an operator (and/or the system controller) the ability to select, from among plural engines with different engine ratings, one of the engines that has an engine power that meets and is closest to the power requirement of the current propulsion needs (or other load operation) of the vehicle or other platform. That is, the controller may be configured to select, from among the two or more engines, the engine that has sufficient engine power for the load operation, but exceeds it by the smallest amount. (For example, if a platform includes 500 hp and 4000 hp engines, the controller would select the 500 hp engine for a load operation under 500 hp, and not the 4000 hp engine.) In this manner, in at least some modes of operation, the selected engine will operate at a relatively higher efficiency, thereby reducing fuel consumption and the emission of pollutants. Engine selection may be tasked based, e.g., for specific tasks a particular engine is always used, or based on quantified efficiencies in a look-up table or the like. Similarly, either engine can provide auxiliary/service power by powering the auxiliary alternator 214.

In any of the embodiments herein, one engine, either the high or low power engine, may be used at any given time. Alternatively, in certain situations, both engines may be used simultaneously to provide propulsion power (more generally, load operation power) or a combination of propulsion and service (i.e., auxiliary) power. Further, one of the engines can be used to crank or start the other. In embodiments having AC motors with inverters, the inverters may be used to crank the engines as well. Further, one of the engines can be used to crank or start the other.

Figure 3:
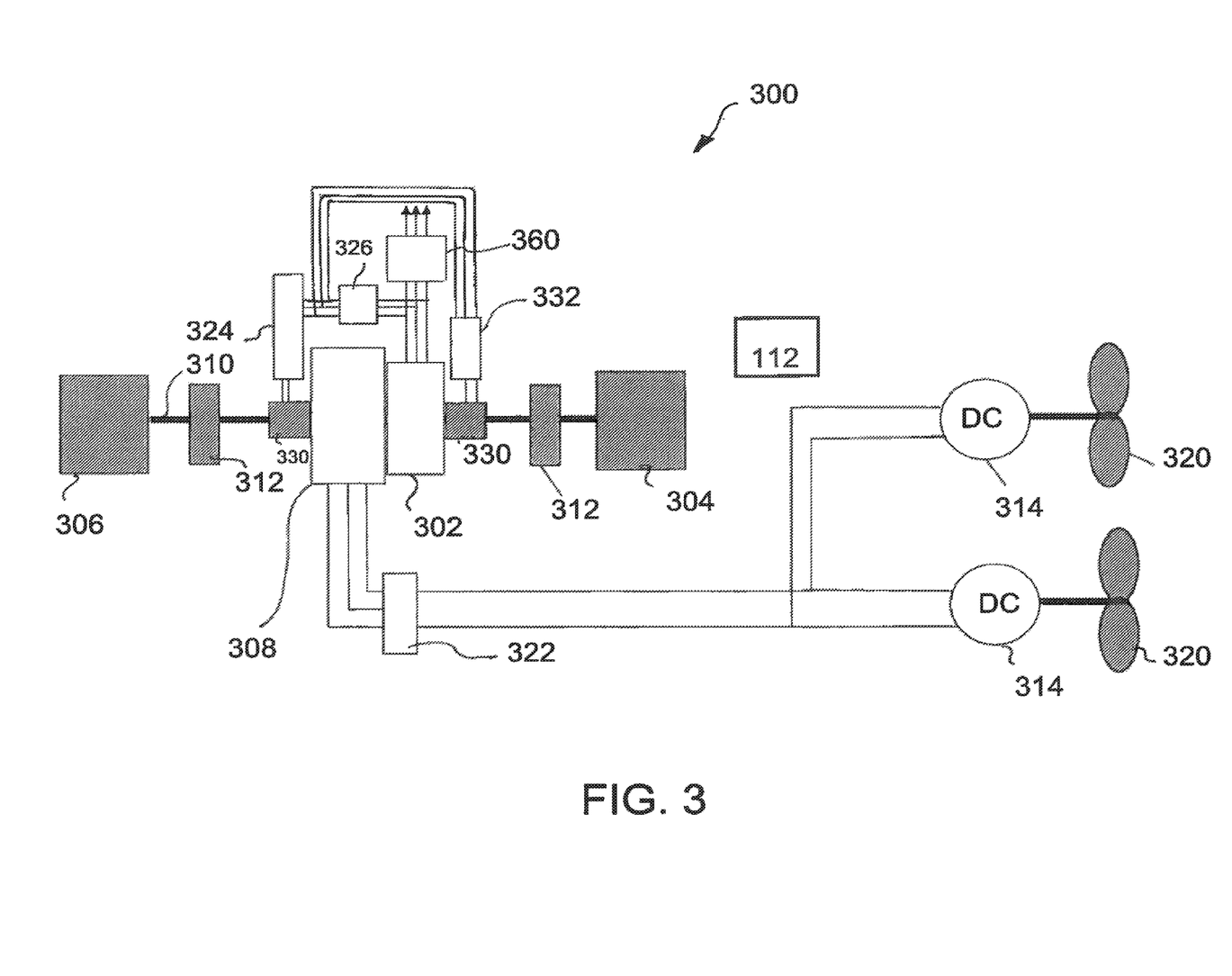
FIG. 3 is a schematic diagram of another embodiment of a system for powering an engine-driven platform.

FIG. 3 shows another embodiment of a system 300 for powering an engine-driven platform. For example, as shown in the figure, the engine-driven platform may be a marine vessel or other vehicle. The system 300 includes one or more DC motors 314 for vehicle propulsion or other load operations, and, as the second generator, a self-excited (non-DFIG) service alternator 302. The system 300 further includes a high power engine 304, a low power engine 306, and a first generator 308, which in this embodiment is a propulsion alternator. The service alternator 302 and the propulsion alternator 308 are operably connected to the engines 304, 306 via a common alternator shaft 310 and clutches 312 with a reduction gear. The propulsion alternator is configured to produce AC power, which is rectified to DC by a rectifier 322. The rectified DC power then passes to the DC motors 314. The DC motors are operably coupled to respective propellers 320, although in other embodiments, the motors 314 are operably coupled to axles, wheels, other marine propulsion means, or the like. In one embodiment, the DC motors 314 are 2000 hp DC motors.

As shown, the service alternator 302 is self-excited. That is, AC power from the alternator passes through a transformer 326 into a service field control AC-to-DC converter (i.e., rectifier) 332, and then back to the service alternator 302 via a field connection 330. AC power from the service alternator 302 also passes through a converter 360 (e.g., rectifier and 50 Hz or 60 Hz inverter) to produce fixed frequency service power. In addition, the service alternator 302 provides AC power to a propulsion field control AC-to-DC converter 324 for use by the propulsion alternator 308, via another field connection 330.

Figure 4:
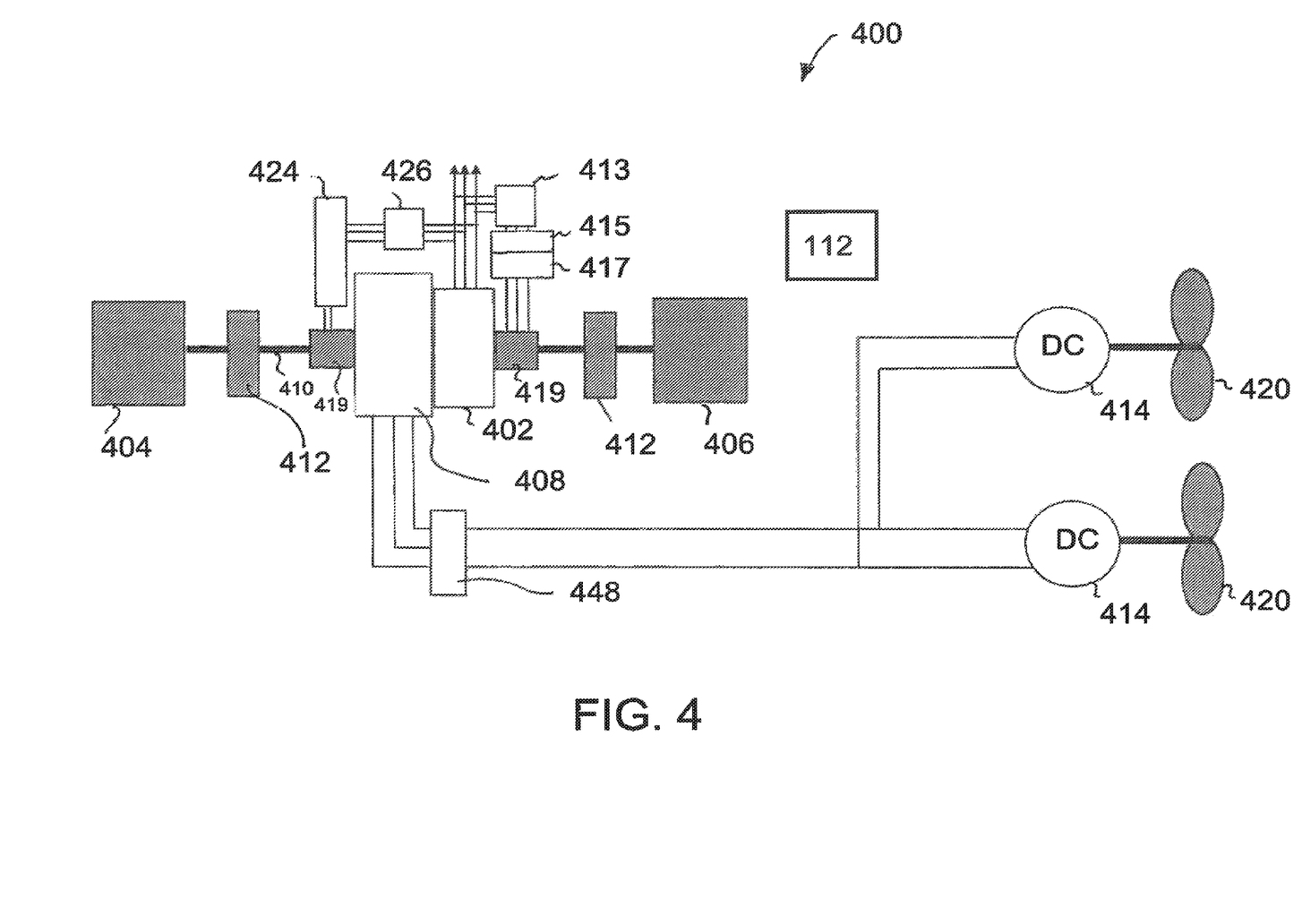
FIG. 4 is a schematic diagram of another embodiment of a system for powering an engine-driven platform.

FIG. 4 shows another embodiment of a system 400 for powering an engine-driven platform, wherein the second generator is a self-excited DFIG 402. The system 400 also includes a low power engine 404, a high power engine 406, and, as the first generator, a propulsion alternator 408, which, along with the DFIG 402, is connected to the engines via a common alternator shaft 410 and clutches 412 with a reduction gear. This system 400 also includes at least one DC motor 414 (two are shown in FIG. 4), each of which is electrically connected to receive rectified DC power from a rectifier 448 to drive propellers 420, wheels, axles, or the like.

In this embodiment, the DFIG is self-excited, and, as such, the AC power it produces, in addition to providing fixed frequency service power (e.g., 50 or 60 Hz 1- or 3-phase AC power), passes through a first transformer 413 into a rectifier 415 and then to an inverter 417 and back into the DFIG 402 via a field connection 419. AC power also passes from the DFIG 402 to a propulsion field control AC-to-DC converter 424 via a second transformer 426, for use by the propulsion alternator 408, via another field connection 419.

Figure 5:
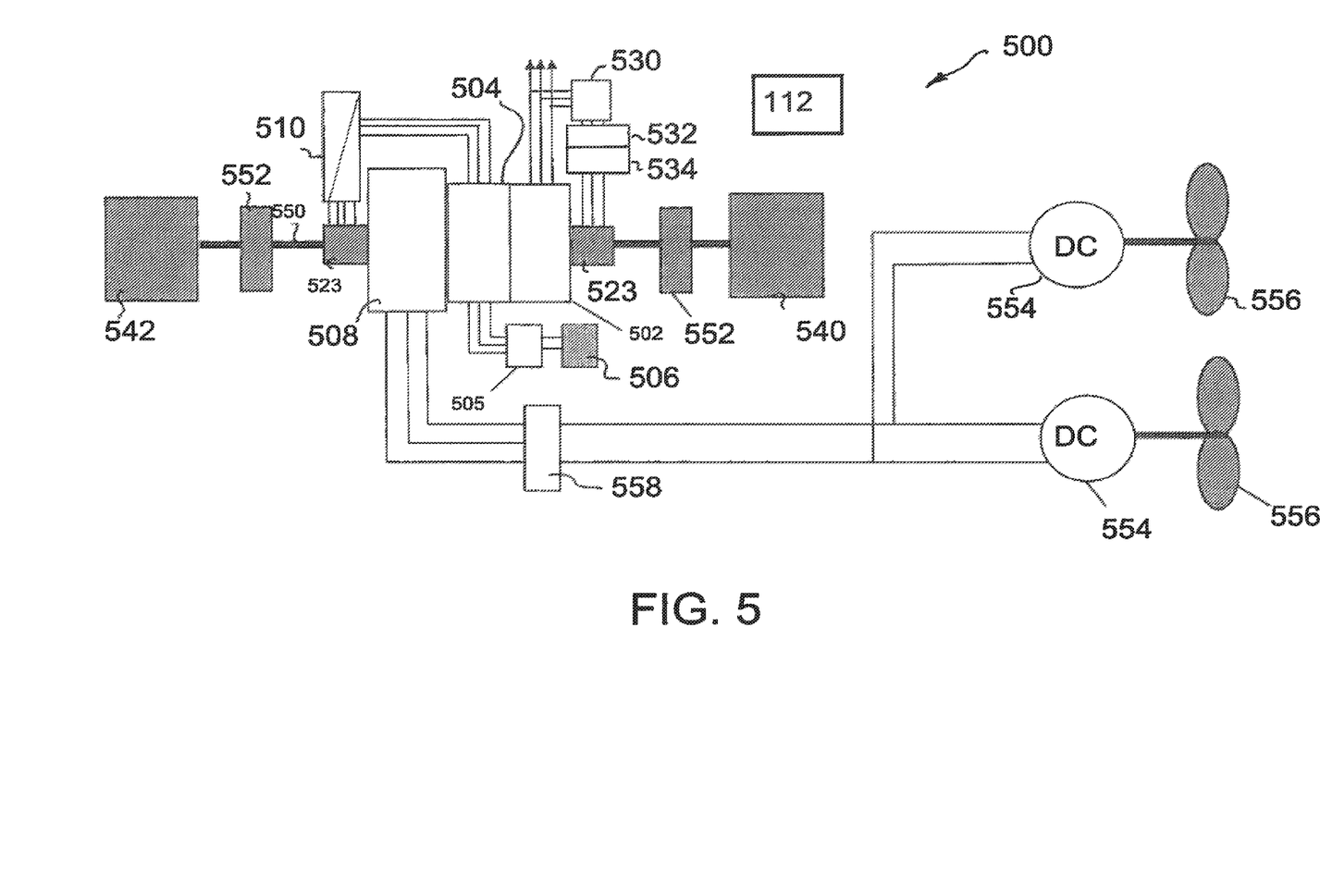
FIG. 5 is a schematic diagram of another embodiment of a system for powering an engine-driven platform.

FIG. 5 shows another embodiment of a system 500 for powering an engine-driven platform, which includes two alternators and a DFIG. More specifically, the system 500 includes a self-excited DFIG 502, which provides fixed frequency service power, a propulsion alternator 508, and a self-excited auxiliary alternator 504, which provides field control for the propulsion alternator and itself. In particular, the self-excited auxiliary alternator 504 is configured to supply electrical power to a field control AC-to-DC converter (i.e., rectifier) 510, for use by the propulsion alternator 508 and to excite the auxiliary alternator 504. In this regard, AC power is provided to the converter 510, which converts it to DC power that is supplied to the propulsion alternator 508 and auxiliary alternator 504 via a field connection 523.

The auxiliary alternator 504 also provides DC-rectified electrical power (via a rectifier 505, e.g., a phase controlled rectifier) to a battery 506.

The DFIG 502 is configured to generate fixed frequency power (e.g., 50 Hz or 60 Hz 1- or 3-phase AC power) for auxiliary/service loads. Additionally, the DFIG is self-excited. For this purpose, attached in electrical series to the power output of the DFIG are a transformer 530, a rectifier 532, and an inverter 534. The transformer and rectifier are configured to convert AC power generated by the DFIG into DC electrical power, which is converted by the inverter into a waveform suitable for exciting the DFIG, via a field connection 523.

The system 500 also includes a high power engine 540 and a low power engine 542, which are operatively connected to the alternators and DFIG via a common alternator shaft 550 and clutches 552 with a reduction gear. The system also includes one or more DC motors 554, each of which is electrically connected to receive DC electrical power from a rectifier 558. The rectifier 558 is electrically connected to a power output of the propulsion alternator 508, for converting AC power received from the propulsion alternator into the DC electrical power. Output shafts of the motors are operably coupled to propellers 556, axles, wheels, or the like. The DC motors may be 2000 hp DC motors.

Figure 6:
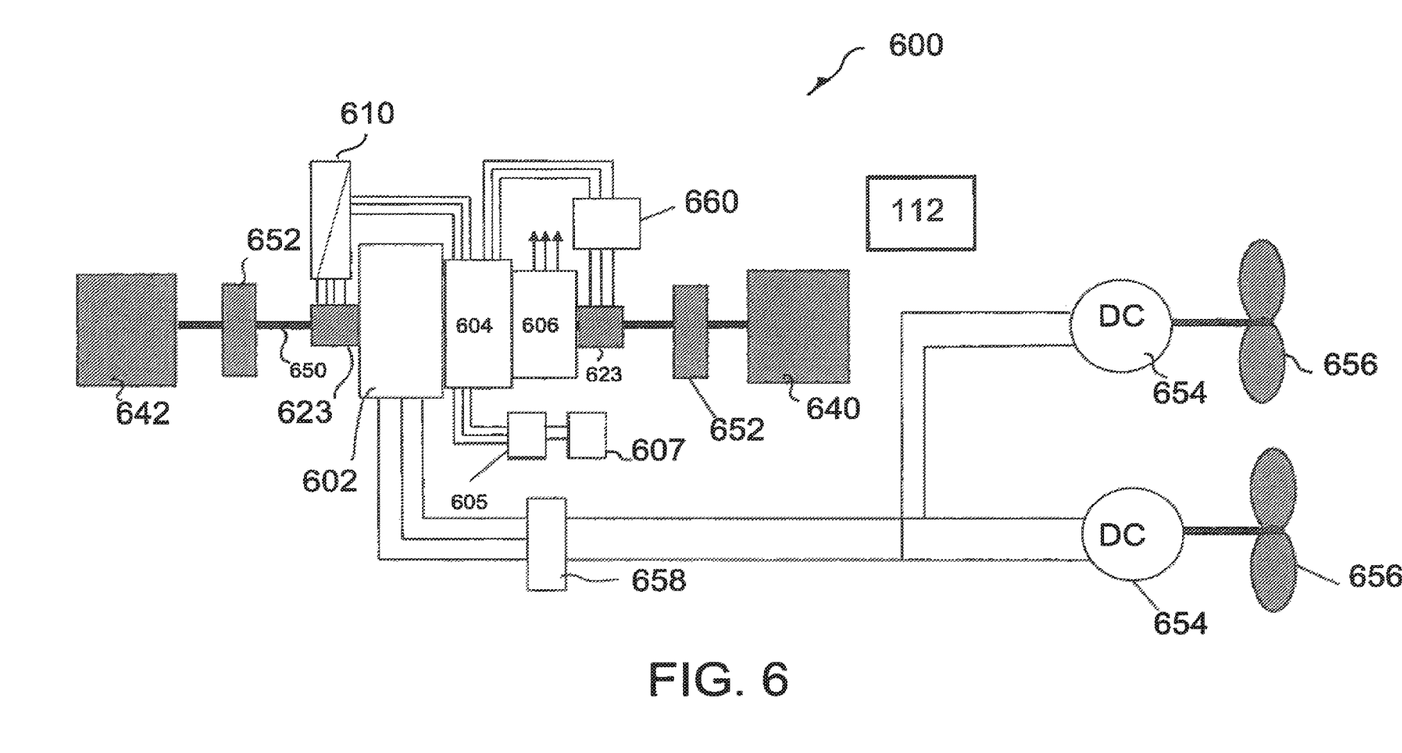
FIG. 6 is a schematic diagram of another embodiment of a system for powering an engine-driven platform.

FIG. 6 shows another embodiment of a system 600 for powering an engine-driven platform. In this embodiment, a propulsion alternator 602 is paired with a self-excited auxiliary alternator 604 and a DFIG 606. The self-excited auxiliary alternator 604 is configured to provide field control for the propulsion alternator and itself, as well as DC rectified electrical power (via a rectifier 605) to a battery 607. For self-excitation, the auxiliary alternator 604 supplies electrical power to a field control AC-to-DC converter (i.e., rectifier) 610, used by the propulsion alternator 602 and the auxiliary alternator 604. AC power is supplied to the converter 610 and then DC-converted power is supplied to the propulsion alternator 602 and auxiliary alternator 604 via a field connection 623.

In this embodiment, the DFIG 606 is configured to provide fixed frequency service power. The DFIG is not, however, self-excited. Instead, the auxiliary alternator 604 provides AC power to the DFIG via a field inverter 660 and field connection 623. Similar to the above-described embodiments, this system 600 also includes a pair of high and low power engines 640, 642 respectively, which are operatively connected to the alternators and the DFIG via a common alternator shaft 650 and clutches 652 with a reduction gear. Moreover, the system includes one or more DC motors 654 (e.g., one or more 2000 hp DC motors), which receive and utilize DC rectified power from a rectifier 658 (coupled to a power output of the propulsion alternator 602) to drive propellers 656, axles, wheels, or the like.

In any of the embodiments of FIGS. 3-6, the DC power output of the rectifier that is coupled to the propulsion alternator may be converted, via transformers, DC-to-DC converters, regulators, etc., from one DC power waveform to another, for provision to the DC motor(s). This will depend on the output of the propulsion alternator, the configuration of the rectifier, and the characteristics of the DC motors.

The embodiments illustrated in FIGS. 3-6 provide a function similar to that of the AC implementation of FIG. 2. That is, the lower or low power engine may be utilized during reduced power conditions, such as in transit to a job, and the higher or high power engine may be used to tow marine vessels or perform other relatively high power tasks.

In all of the embodiments discussed herein, either engine can provide propulsion, thereby facilitating operation at a relatively high efficiency while producing fixed frequency power, e.g., 50 or 60 Hz power, for service uses. Either engine can provide auxiliary/service power by powering the auxiliary alternator, service alternator, and/or DFIG.

Although FIGS. 3-6 show DC traction systems (e.g., DC motors for vehicle propulsion), any of the embodiments of FIGS. 3-6 could instead utilize AC motors, similar to the configuration shown in FIG. 2. For example, instead of the output of the first alternator being rectified to DC power that is routed (directly or indirectly) to DC motors, the DC power could instead be converted to AC power, using an inverter or other power converter, for provision to one or more AC motors.

In certain embodiments, it may be possible to have two DFIGs combined with a propulsion alternator. In other embodiments, three alternators, and no DFIGs, may be utilized. As will be appreciated, the particular topology used may be selected based on weight, cost, application (e.g., vehicle vs. stationary power generation), system simplicity, and similar considerations.

In any of the systems herein that utilize AC or DC traction motors, the system may include one motor only, two motors only, or more than two motors.

As should be appreciated, a system with two engines each configured to run a generator for load operations (e.g., a propulsion alternator for generating electrical power for vehicle propulsion), as in the embodiments herein, provides a level of redundancy as against engine failure modes. For example, if one of the engines enters into a state where it is non-operational, then the other engine may be used for propulsion purposes. Additionally, having plural traction motors (and related equipment) provides similar redundancy against motor failure, etc.

In an embodiment, a system includes a high power engine, a low power engine, a first generator, a second generator, and a controller, which are configured to be disposed in an engine-driven platform. The first generator is configured to generate first electrical power for a load operation of the engine-driven platform. The high power engine and the low power engine are operably coupled for either to drive the first generator. The second generator is configured to generate second electrical power. The controller is configured to select either of the low power engine or the high power engine to drive the first generator based on the load operation.

In an embodiment, a system includes a high power engine, a low power engine, a first generator, a second generator, and a controller, which are configured to be disposed in an engine-driven platform. The first generator is configured to generate first electrical power for a load operation of the engine-driven platform. The high power engine and the low power engine are operably coupled for either to drive the first generator. The second generator is configured to generate second electrical power. The controller is configured to select either of the low power engine or the high power engine to drive the first generator based on the load operation. The high power engine and the low power engine are operably coupled for either to drive the second generator. Also, the high and low power engines are operatively connected to a rotatable shaft for driving the first generator and the second generator.

In an embodiment, a system includes a high power engine, a low power engine, a first generator, a second generator, and a controller, which are configured to be disposed in an engine-driven platform. The first generator is configured to generate first electrical power for a load operation of the engine-driven platform. The high power engine and the low power engine are operably coupled for either to drive the first generator. The second generator is configured to generate second electrical power. The controller is configured to select either of the low power engine or the high power engine to drive the first generator based on the load operation. The high power engine and the low power engine are operably coupled for either to drive the second generator. Also, the second generator is configured to generate the second electrical power at a fixed frequency at least partially for powering auxiliary loads of the engine-driven platform. For example, the fixed frequency may be from 50 Hz to 60 Hz.

In an embodiment, a system includes a high power engine, a low power engine, a first generator, a second generator, and a controller, which are configured to be disposed in an engine-driven platform. The first generator is configured to generate first electrical power for a load operation of the engine-driven platform. The high power engine and the low power engine are operably coupled for either to drive the first generator. The second generator is configured to generate second electrical power. The controller is configured to select either of the low power engine or the high power engine to drive the first generator based on the load operation. A ratio of engine powers of the high power engine to the low power engine is from about 4:1 to about 10:1.

In an embodiment, a system includes a high power engine, a low power engine, a first alternator (e.g., a propulsion alternator), a DFIG, and a controller, which are configured to be disposed in an engine-driven platform. The first alternator is configured to generate first electrical power for a load operation of the engine-driven platform. The high power engine and the low power engine are operably coupled for either to drive the first alternator. The DFIG is configured to generate second electrical power. The controller is configured to select either of the low power engine or the high power engine to drive the first alternator based on the load operation.

In an embodiment, a system includes a high power diesel engine, a low power diesel engine, a first alternator, a second generator, and a controller, which are configured to be disposed in a vehicle. The first alternator is configured to generate first electrical power for propulsion of the vehicle. The high power diesel engine and the low power diesel engine are operably coupled for either to drive the first alternator. The second generator is configured to generate second electrical power. The controller is configured to select either of the low power diesel engine or the high power diesel engine to drive the first alternator, based on a power requirement of the propulsion. The system further includes at least one of one or more AC motors or one or more DC motors operatively connected to receive the first electrical power from the first alternator for the vehicle propulsion. Also, the second generator comprises a DFIG configured to generate the second electrical power at a fixed frequency of from 50 Hz to 60 Hz at least partially for powering auxiliary loads of the vehicle.

In an embodiment, a system includes a high power engine, a low power engine, a first generator, a second generator, and a controller, which are configured to be disposed in a stationary generator unit. The first generator is configured to generate first electrical power for a load operation of the stationary generator unit. The high power engine and the low power engine are operably coupled for either to drive the first generator. The second generator is configured to generate second electrical power. The controller is configured to select either of the low power engine or the high power engine to drive the first generator based on the load operation. The generator unit has at least one power output connector 115 (see FIG. 1) for the first electrical power to power one or more electrical loads 116 located off-board the generator unit as the load operation.

In an embodiment, a system includes a high power engine, a low power engine, a first generator (e.g., a first alternator), a second generator (e.g., a second alternator), and a controller, which are configured to be disposed in an engine-driven platform. The first generator is configured to generate first electrical power for a load operation of the engine-driven platform. The high power engine and the low power engine are operably coupled for either to drive the first generator. The second generator is configured to generate second electrical power. The controller is configured to select either of the low power engine or the high power engine to drive the first generator based on the load operation. The system further includes an inverter (and in some embodiments, also a rectifier) that is coupled to an output of the second generator. The inverter is configured to convert the second electrical power to third electrical power at a fixed frequency (e.g., from 50 Hz to 60 Hz), for powering auxiliary or service loads, for example.

In an embodiment, a system includes a first engine, a second engine, a first generator, a second generator, and a controller. The first and second engines are disposed in an engine-driven platform and have first and second engine powers, respectively. (A ratio of the first engine power of the first engine to the second engine power of the second engine may be from about 4:1 to about 10:1.) The second engine power is lower than the first engine power. The first generator is operatively connected to the first engine and to the second engine, and is configured to be driven by either of the first engine or the second engine for generating first electrical power for a load operation of the engine-driven platform. The second generator is operatively connected to the first engine and to the second engine, and is configured to be driven by either of the first engine or the second engine for generating second electrical power. The controller is configured to select the first engine for driving the first generator in a first mode of operation of the engine-driven platform for a relatively higher power level of load operation and to select the second engine for driving the first generator in a second mode of operation of the engine-driven platform for a relatively lower power level of load operation.

In an embodiment, a system includes a first engine, a second engine, a first generator, a second generator, and a controller. The first and second engines are disposed in an engine-driven platform and have first and second engine powers, respectively. The second engine power is lower than the first engine power. The first generator is operatively connected to the first engine and to the second engine, and is configured to be driven by either of the first engine or the second engine for generating first electrical power for a load operation of the engine-driven platform. The second generator is operatively connected to the first engine and to the second engine, and is configured to be driven by either of the first engine or the second engine for generating second electrical power. The controller is configured to select the first engine for driving the first generator in a first mode of operation of the engine-driven platform for a relatively higher power level of load operation and to select the second engine for driving the first generator in a second mode of operation of the engine-driven platform for a relatively lower power level of load operation. The second generator is configured to generate the second electrical power at a fixed frequency (e.g., from 50 Hz to 60 Hz) at least partially for powering auxiliary loads of the engine-driven platform.

In another embodiment of the system, the system further includes a rotatable shaft, wherein the first and second engines, the first generator, and the second generator are operatively connected to the rotatable shaft for the first and second engines to drive the first generator and the second generator.

In another embodiment of the system, the engine-driven platform is a vehicle, and the load operation includes vehicle propulsion. The first generator is a first alternator, and the system further includes at least one of one or more AC motors or one or more DC motors operatively connected to receive the first electrical power from the first alternator for the vehicle propulsion.

In embodiments, the second generator is a DFIG, which may be self-exciting or other than self-exciting.

In an embodiment, a system includes a first engine, a second engine, a first generator (e.g., a first alternator), a second generator (e.g., a DFIG), and a controller. The first and second engines (which may be diesel engines) are disposed in a vehicle and have first and second engine powers, respectively. The second engine power is lower than the first engine power. The first generator is operatively connected to the first engine and to the second engine, and is configured to be driven by either of the first engine or the second engine for generating first electrical power for vehicle propulsion. The second generator is operatively connected to the first engine and to the second engine, and is configured to be driven by either of the first engine or the second engine for generating second electrical power. The controller is configured to select the first engine for driving the first generator in a first mode of operation of the vehicle for a relatively higher power level of propulsion and to select the second engine for driving the first generator in a second mode of operation of the engine-driven platform for a relatively lower power level of propulsion. The second generator is configured to generate the second electrical power at a fixed frequency (e.g., from 50 Hz to 60 Hz) at least partially for powering auxiliary loads of the vehicle. That is, an output of the second generator is operably coupled to plural auxiliary loads in the vehicle, for the auxiliary loads to receive the second electrical power from the second generator. The system further comprises at least one of one or more AC motors or one or more DC motors operatively connected to receive the first electrical power from the first generator for the vehicle propulsion. If the vehicle is a marine vessel, it may further include one or more propellers operatively connected to the at least one of the one or more AC motors or the one or more DC motors.

In another embodiment, the system further includes a rotatable shaft. The first and second engines, the first generator (e.g., first alternator), and the second generator (e.g., DFIG) are operatively connected to the rotatable shaft for the first and second engines to drive the first and second generators.

In an embodiment, a system includes a first engine, a second engine, a first generator, a second generator, and a controller. The first and second engines are disposed in a stationary generator unit and have first and second engine powers, respectively. (A ratio of the first engine power of the first engine to the second engine power of the second engine may be from about 4:1 to about 10:1.) The second engine power is lower than the first engine power. The first generator is operatively connected to the first engine and to the second engine, and is configured to be driven by either of the first engine or the second engine for generating first electrical power for powering one or more electrical loads located off-board the generator unit. The second generator is operatively connected to the first engine and to the second engine, and is configured to be driven by either of the first engine or the second engine for generating second electrical power. The controller is configured to select the first engine for driving the first generator in a first mode of operation of the generator unit for a relatively higher power level of powering off-board load(s) and to select the second engine for driving the first generator in a second mode of operation of the generator unit for a relatively lower power level of powering the off-board load(s). The stationary generator unit may include a power output connector for permanently or detachably electrically connecting the generator unit to off-board loads.

In an embodiment, a system for providing mechanical and electrical power in an engine-driven platform includes a first engine having a first power rating and a second engine having a second power rating that is lower than the first power rating. The system further includes a source for generating electro-mechanical propulsive power and a source for generating fixed frequency electrical power. Both sources are operatively connected to and powered by the first and/or second engines. The first and/or second engines may be selected to power the source for generating electro-mechanical power depending upon situational power requirements of the engine-driven platform. The sources of electro-mechanical power and fixed frequency electrical power, as well as the first and second engines, can be operatively connected to a rotatable shaft and, in embodiments, the first and second engines are diesel engines and the source for generating electro-mechanical power is an alternator operatively connected to an AC motor or an alternator operatively connected to a DC motor. The source for generating fixed frequency electrical power can be an alternator, which may be self-exciting, or a DFIG which may also be self-exciting, or an inverter.

In another embodiment, a system for powering a marine vessel is provided. The system includes a high power diesel engine and a low power diesel engine, the high and low power diesel engines being connected to a rotatable shaft. The system further includes a propulsion alternator connected to the rotatable shaft and a source of fixed frequency electrical power connected to the rotatable shaft. The high and/or low power diesel engines may be selected to power the propulsion alternator depending upon situational power requirements of the marine vessel. The fixed frequency power may be from 50 Hz to 60 Hz, and a ratio of power ratings of the high power diesel engine to the low power diesel engine may range from about 4:1 to about 10:1.

In embodiments, the system further includes a battery for energy storage and distribution. The source of fixed frequency electrical power may be an alternator, a DFIG, which may be self-exciting, or an inverter. The system may further include an auxiliary alternator, which powers the battery. In embodiments, the system includes at least one clutch on the rotatable shaft, which can selectively prevent one of the engines from rotating the shaft, and a reduction gear on the shaft. The system may also include a controller to control selection as between the two engines, to improve system fuel efficiency and/or lower emissions.

In another embodiment, a marine vessel includes a first engine having a first engine power, a second engine having a second engine power that is lower than the first engine power, at least one propeller, one or more AC motors and/or one or more DC motors operatively connected to drive the at least one propeller, a controller, and a propulsion alternator. The propulsion alternator is operatively connected to the first engine and to the second engine, and is configured to be driven by either of the first engine or the second engine for generating first electrical power for powering the one or more AC motors and/or the one or more DC motors. The marine vessel further includes a DFIG and/or a second alternator, which is operatively connected to the first engine and to the second engine and configured to be driven by either of the first engine or the second engine for generating second electrical power. The controller is configured to select the first engine for driving the propulsion alternator in a first mode of operation of the marine vessel for a relatively higher power level of propulsion and to select the second engine for driving the propulsion alternator in a second mode of operation of the vessel for a relatively lower power level of propulsion. The DFIG or the second alternator is configured to generate the second electrical power at a fixed frequency of from 50 Hz to 60 Hz, or an inverter may be provided, coupled to an output of the DFIG or second alternator, to convert the second electrical power to third electrical power at the fixed frequency of from 50 Hz to 60 Hz.

In another embodiment, a method of powering an engine-driven platform includes determining (e.g., with a controller) power requirements for the engine-driven platform to complete a task, selecting an engine having an engine power appropriate to complete the task from a plurality of engines on board the engine-driven platform each having different engine powers, and providing fixed frequency electrical power from one of the plurality of engines.

In yet another embodiment, a method of powering a marine vessel is provided. The method includes the steps of determining the power requirements for the vessel to complete a task and selecting an engine having a power rating appropriate to complete the task from a plurality of engines each having different power ratings. The method further includes providing fixed frequency electrical power from one of the plurality of engines.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

What is claimed is:

1. A system comprising:
a high power engine disposed in an engine-driven platform;
a low power engine disposed in the engine-driven platform;
a first generator configured to generate first electrical power for a load operation of the engine-driven platform, wherein the high power engine and the low power engine are operably coupled for either the high power engine or the low power engine to drive the first generator;
a second generator disposed in the engine-driven platform and configured to generate second electrical power; and
a controller configured to select either of the low power engine or the high power engine to drive the first generator based on the load operation;
wherein the high power engine and the low power engine are operably coupled for either the high power engine or the low power engine to drive the second generator, and wherein the high and low power engines are operably connected to a rotatable shaft for driving the first generator and the second generator.

2. The system of claim 1, wherein the second generator is configured to generate the second electrical power at a fixed frequency at least partially for powering auxiliary loads of the engine-driven platform.

3. The system of claim 2, wherein the fixed frequency is from 50 Hz to 60 Hz.

4. The system of claim 1, wherein a ratio of engine powers of the high power engine to the low power engine is from about 4:1 to about 10:1.

5. The system of claim 1, wherein the first generator comprises a first alternator and the second generator comprises a doubly fed induction generator.

6. The system of claim 1, wherein:
the engine-driven platform is a vehicle, and the load operation includes vehicle propulsion;
the high power engine comprises a first diesel engine;
the low power engine comprises a second diesel engine;
the first generator comprises a first alternator, and the system further comprises at least one of one or more AC motors or one or more DC motors operably connected to receive the first electrical power from the first alternator for the vehicle propulsion; and
the second generator comprises a doubly fed induction generator configured to generate the second electrical power at a fixed frequency of from 50 Hz to 60 Hz at least partially for powering auxiliary loads of the vehicle.

7. The system of claim 1, wherein the engine-driven platform is a stationary generator unit having a power output connector for the first electrical power to power one or more electrical loads located off-board the generator unit as the load operation.

8. The system of claim 1, further comprising an inverter coupled to an output of the second generator, wherein the inverter is configured to convert the second electrical power to third electrical power at a fixed frequency.

9. A system comprising:
a first engine disposed in an engine-driven platform and having a first engine power;
a second engine disposed in the engine-driven platform and having a second engine power that is lower than the first engine power;
a first generator operably connected to the first engine and to the second engine, wherein the first generator is configured to be driven by either of the first engine or the second engine for generating first electrical power for a load operation of the engine-driven platform;
a second generator operably connected to the first engine and to the second engine, wherein the second generator is configured to be driven by either of the first engine or the second engine for generating second electrical power;
a rotatable shaft, wherein the first and second engines, the first generator, and the second generator are operably connected to the rotatable shaft for the first and second engines to drive the first generator and the second generator; and
a controller configured to select the first engine for driving the first generator in a first mode of operation of the engine-driven platform for a relatively higher power level of the load operation and to select the second engine for driving the first generator in a second mode of operation of the engine-driven platform for a relatively lower power level of the load operation.

10. The system of claim 9, wherein the second generator is configured to generate the second electrical power at a fixed frequency at least partially for powering auxiliary loads of the engine-driven platform.

11. The system of claim 10, wherein the engine-driven platform comprises a vehicle and the load operation includes vehicle propulsion, the first generator comprises a first alternator, and the system further comprises at least one of one or more AC motors or one or more DC motors operably connected to receive the first electrical power from the first alternator for the vehicle propulsion.

12. The system of claim 10, wherein the second generator comprises a doubly fed induction generator.

13. The system of claim 12, wherein the doubly fed induction generator is self-exciting.

14. The system of claim 12, wherein the fixed frequency is from 50 Hz to 60 Hz.

15. The system of claim 10, wherein the fixed frequency is from 50 Hz to 60 Hz.

16. The system of claim 10, wherein:
the engine-driven platform comprises a vehicle and the load operation includes vehicle propulsion;
the first engine comprises a first diesel engine;
the second engine comprises a second diesel engine;
the first generator comprises a first alternator, and the system further comprises at least one of one or more AC motors or one or more DC motors operably connected to receive the first electrical power from the first alternator for the vehicle propulsion;
the second generator comprises a doubly fed induction generator and the fixed frequency is from 50 Hz to 60 Hz;
the system further comprises a rotatable shaft, wherein the first and second diesel engines, the first alternator, and the doubly fed induction generator are operably connected to the rotatable shaft for the first and second diesel engines to drive the first alternator and the doubly fed induction generator; and
an output of the doubly fed induction generator is operably coupled to plural auxiliary loads in the vehicle, for the auxiliary loads to receive the second electrical power from the doubly fed induction generator.

17. A marine vessel comprising:
the system of claim 16; and
one or more propellers operably connected to the at least one of the one or more AC motors or the one or more DC motors.

18. The system of claim 9, wherein a ratio of the first engine power of the first engine to the second engine power of the second engine is from about 4:1 to about 10:1.

19. The system of claim 9, wherein the engine-driven platform is a stationary generator unit having a power output connector for the first electrical power to power one or more electrical loads located off-board the generator unit as the load operation.

20. The system of claim 9, further comprising an inverter coupled to an output of the second generator, wherein the inverter is configured to convert the second electrical power to third electrical power at a fixed frequency.

21. A marine vessel comprising:
- a first engine having a first engine power;
- a second engine having a second engine power that is lower than the first engine power;
- at least one propeller;
- at least one of one or more AC motors or one or more DC motors operably connected to drive the at least one propeller;
- a propulsion alternator operably connected to the first engine and to the second engine, wherein the propulsion alternator is configured to be driven by either of the first engine or the second engine for generating first electrical power for powering the at least one of the one or more AC motors or the one or more DC motors;
- at least one of a doubly fed induction generator or a second alternator operably connected to the first engine and to the second engine, wherein the at least one of the doubly fed induction generator or the second alternator is configured to be driven by either of the first engine or the second engine for generating second electrical power;
- a rotatable shaft, wherein the first and second engines, the propulsion alternator, and the doubly fed induction generator are operably connected to the rotatable shaft for the first and second engines to drive the propulsion alternator and the doubly fed induction generator; and
- a controller configured to select the first engine for driving the propulsion alternator in a first mode of operation of the marine vessel for a relatively higher power level of propulsion and to select the second engine for driving the propulsion alternator in a second mode of operation of the vessel for a relatively lower power level of propulsion;
- wherein: the at least one of the doubly fed induction generator or the second alternator is configured to generate the second electrical power at a fixed frequency of from 50 Hz to 60 Hz; or the marine vessel further comprises an inverter configured to convert the second electrical power to third electrical power at the fixed frequency of from 50 Hz to 60 Hz.

* * * * *